(12) United States Patent
Maunder

(10) Patent No.: US 7,677,612 B2
(45) Date of Patent: Mar. 16, 2010

(54) CLAMP

(75) Inventor: Roy Peter Maunder, Hampshire (GB)

(73) Assignee: BioPure Technology Ltd., Hampshire (GB)

( * ) Notice: Subject to any disclaimer, the term of this patent is extended or adjusted under 35 U.S.C. 154(b) by 0 days.

(21) Appl. No.: 12/284,793

(22) Filed: Sep. 25, 2008

(65) Prior Publication Data

US 2009/0096210 A1    Apr. 16, 2009

(30) Foreign Application Priority Data

Oct. 12, 2007  (GB) ................... 0719972.2
Apr. 9, 2008   (GB) ................... 0806433.9

(51) Int. Cl.
*F16L 23/00* (2006.01)

(52) U.S. Cl. ...................................... 285/411

(58) Field of Classification Search ................. 285/367, 285/411, 410, 409, 38, 408, 407, 366, 365
See application file for complete search history.

(56) References Cited

U.S. PATENT DOCUMENTS

| | | | | |
|---|---|---|---|---|
| 2,459,251 | A * | 1/1949 | Stillwagon | 285/104 |
| 3,267,547 | A * | 8/1966 | Morriss, Jr. | 24/279 |
| 4,408,788 | A * | 10/1983 | Beukema | 285/419 |
| 4,722,561 | A * | 2/1988 | Heckethorn et al. | 285/411 |
| 6,581,977 | B1 * | 6/2003 | Dole et al. | 285/112 |

* cited by examiner

*Primary Examiner*—David E Bochna
(74) *Attorney, Agent, or Firm*—Lambert & Associates; Adam J. Bruno; Gary E. Lambert

(57) ABSTRACT

A clamp for connecting flanged tubes comprising a pair of tangs having a tampered groove around their insides to engage the flanges. One of the tangs is provided with a pivotally connected screw, which passes through an aperture in one end. A nut attached to the screw holds the tangs in position. To prevent rotation of the tang about the screw, the lower shaft of the screw is provided in a non-circular shape, with the aperture in the tang being provided in mating conformity.

5 Claims, 2 Drawing Sheets

CLAMP

This application claims the benefit of United Kingdom Patent Application Serial Number GB0719972.2 filed on Oct. 12, 2007 and United Kingdom Patent Application Serial Number GB0806433.9 filed on Apr. 9, 2008.

BACKGROUND OF THE INVENTION

1. Field of Invention

The present invention relates to clamps, particularly though not exclusively for connecting flanged tubes for use in the pharmaceutical, food and related industries.

2. Description of the Related Art

In my earlier patent, GB 2361753, I describe a clamp for connecting flanged tubes. This clamp is very successful for connecting flanged tubes of up to and including approximately four inches in diameter. However, for clamps of a larger size, I found that the hinge starts to fail on prolonged use.

While using the same screw and nut arrangement at both sides of the clamp provides a secure clamp, such a clamp is awkward, difficult to use and cannot be used one-handed.

SUMMARY OF THE INVENTION

The object of the present invention is to provide an improved joint for a clamp or the like.

According to the invention there is provided a joint for a clamp or the like, having a pair of tangs, the joint including a screw pivotally connected to a first tang, and having a section of non-circular shaped shaft extending from the pivotal connection, the second tang having a complimentary aperture for receiving the screw, the fit between the shaft and the aperture preventing significant rotation of the second tang around the screw.

Preferably, the shape of the shaft is essentially square, with the aperture in the tang also being square. Alternatively, the shaft may be triangular, pentagonal, hexagonal or any other non-circular shape.

The joint further includes a nut for connection to the thread of the screw to hold the tangs in position.

Preferably, the second tang may have a projection at least partially surrounding its aperture with the nut having a complimentary indentation. Typically the projection and indentation will be substantially conical.

Advantageously, the second tang may be provided with at least one projection to mate on the first tang, to prevent over-tightening of the clamp tangs.

BRIEF DESCRIPTION OF THE DRAWINGS

To help understanding of the invention, a specific embodiment thereof will now be described by way of example and with references to the accompanying drawings in which.

DETAILED DESCRIPTION OF THE PREFERRED EMBODIMENTS

Figure 1:
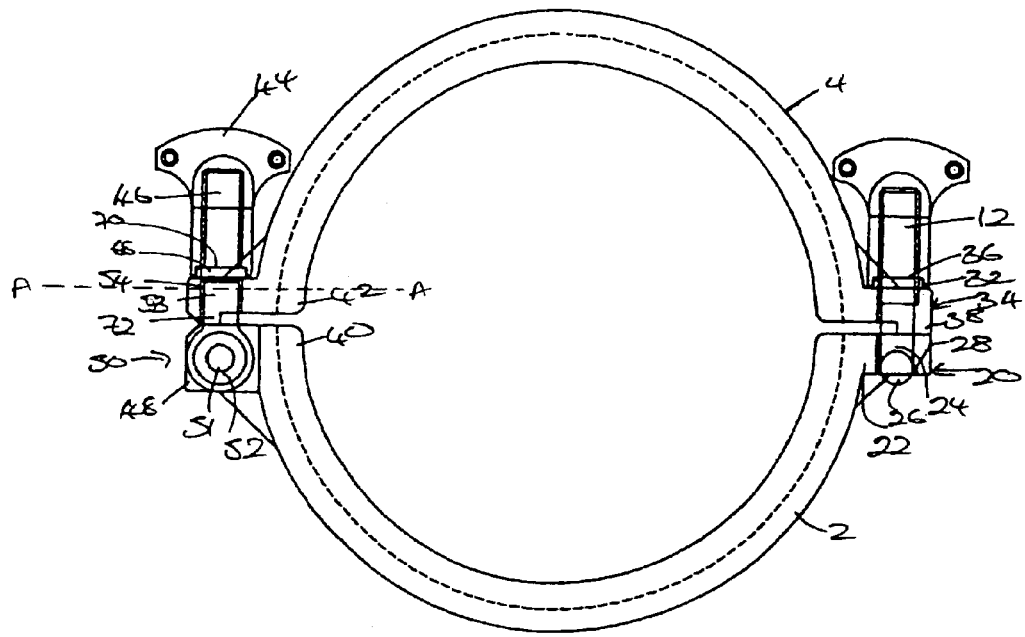
FIG. 1 is a side view of a clamp according to the present invention in the closed position.
Figure 2:
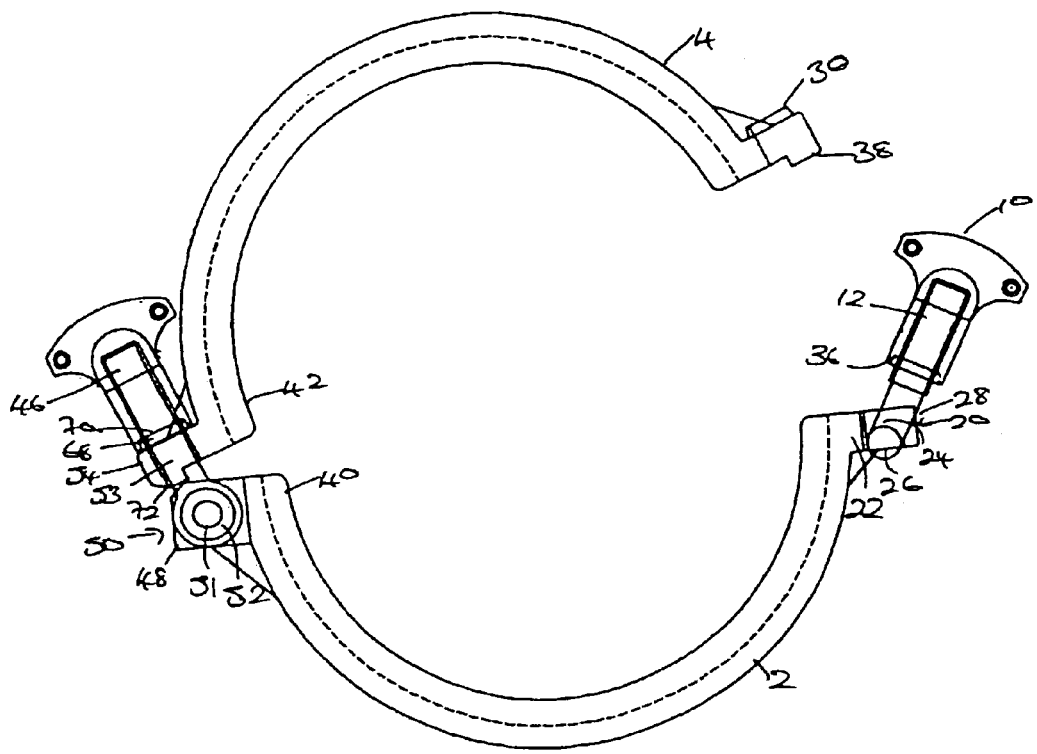
FIG. 2 is a side view of the clamp in FIG. 1 in an open position.
Figure 3:
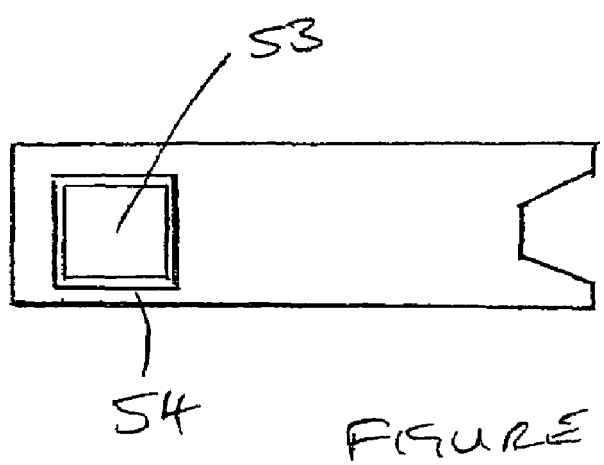
FIG. 3 is a cross-sectional view of the clamp in FIG. 1 illustrating a noncircular shaped shaft.
Figure 4:
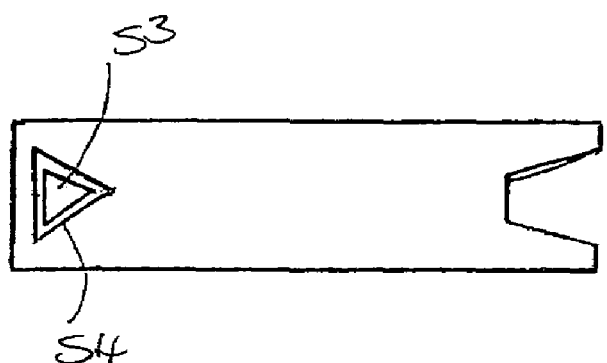
FIG. 4 is a cross-sectional view of the clamp in FIG. 1 illustrating a triangular shaped shaft.

Referring to FIGS. 1 and 2, the clamp thereshown is for clamping flanged tubes, particularly for use in the pharmaceutical and food industries.

The clamp comprises a pair of substantially semi-circular tangs 2, 4. The tangs have a tapered 6 groove running around the inside of them, to engage the flanges of a pair of flanged tubes with a seal therebetween, not shown, holding the tubes in sealing relationship with each other.

At one side, the tangs 2, 4 are held together with a nut 10 and screw 12 as described in my earlier patent GB 2361753. One tang 2 has a clevis 20 defined by two lugs 22. Each had an overhung recess 24 into which the crosshead 26 of the screw 12 clips. A cross-bar 28 connects the lugs remote from their tang, whereby the screw is limited in its angular displacement about the recess. The cross-bar also stabilizes the lugs against relative displacement under load when the nut is tightened.

The other tang 4 has a part conical formation 30 on lugs 32 defining a clevis 34. The nut 10 has a complimentary conical recess 36. Engagement of the formation 30 in the recess 36 restrains the lugs from separating under load as the nut is tightened. Mutual approach of the tangs is limited by projections 38 on the lugs 32 towards the lugs 22 to avoid over-tightening.

The other ends 40, 42 of the tangs 2, 4 are also held together with a nut 44 and screw 46. The screw 46 is held captive between a pair of lugs 48 defining a clevis 50 in one of tangs 2. The screw 46 is provided with a ring 52 which fits in the clevis 50 held in position by a pin 51. The screw is provided with a section of lower shaft 53 of square cross-sectional. The other tang 4 is provided with a square aperture 54 for receiving the screw 46. Thus, use of the square shaft 53 and square aperture 54, prevents significant rotational movement of the tangs 2, 4 rendering the clamp stronger and easier to use. It is not essential that the shaft and aperture are square; they could be triangular, hexagonal or any non-circular shape.

The nut 44 is provided with an internal thread for engagement with the screw 46. This enables tightening and loosening of the nut of the screw and thus limited movement between the two tangs.

The aperture 54 is surrounded by a conical projection 68 with a complimentary conical indentation 70 in the nut 44 centering the nut on the tang and stabilizing the aperture. The tang 4 is also provided in projections 72 to prevent over-tightening of the nut 44 onto the screw 46.

The invention is not intended to be restricted to the details of the above described embodiment. For instance, this connected nut and screw arrangement can be used on any form of clamp, including a pinch clamp.

I claim:

1. A joint for a clamp, having a pair of tangs, said joint including a screw pivotally connected to a first tang, and having a section of non-circular shaped shaft extending from said pivotal connection, a second tang having a complimentary aperture for receiving said section of shaft, thus preventing significant rotation of said second tang around said screw, further including a nut for connection to a thread of said screw and wherein said second tang has a projection at least partially surrounding its aperture and said nut has a complementary indentation.

2. A joint as claimed in claim 1, wherein the shape of said sectional of shaft is substantially square, with said aperture in said tang also being square.

3. A joint as claimed in claim 1, wherein the shape of the shaft is triangular, with said aperture in said tang also being triangular.

4. A joint as claimed in claim 1, wherein said projection and indentation are substantially conical.

5. A joint as claimed in claim 1, wherein said second tang is provided with at least one projection to mate on said first tang, to prevent over-tightening of said clamp tangs.

* * * * *